US012277434B2

(12) United States Patent
Singha et al.

(10) Patent No.: US 12,277,434 B2
(45) Date of Patent: Apr. 15, 2025

(54) HYPERVISOR ASSISTED SECURITY OF DANGLING VOLUMES FOR CONTAINERS

(71) Applicant: VMware LLC, Palo Alto, CA (US)

(72) Inventors: Zubraj Singha, Bangalore (IN); Tanay Ganguly, Bangalore (IN); Goresh Musalay, Bangalore (IN); Sanoj Ku, Bangalore (IN)

(73) Assignee: VMware LLC, Palo Alto, CA (US)

( * ) Notice: Subject to any disclaimer, the term of this patent is extended or adjusted under 35 U.S.C. 154(b) by 468 days.

(21) Appl. No.: 17/667,547

(22) Filed: Feb. 9, 2022

(65) Prior Publication Data

US 2023/0195494 A1 Jun. 22, 2023

(30) Foreign Application Priority Data

Dec. 17, 2021 (IN) .............................. 202141058903

(51) Int. Cl.
*G06F 9/455* (2018.01)
(52) U.S. Cl.
CPC ................... *G06F 9/45558* (2013.01); *G06F 2009/45583* (2013.01); *G06F 2009/45587* (2013.01)

(58) Field of Classification Search
CPC ....... G06F 9/45558; G06F 2009/45583; G06F 2009/45587; G06F 2009/45579
See application file for complete search history.

(56) References Cited

U.S. PATENT DOCUMENTS

2023/0051347 A1* 2/2023 Sakib ..................... G06F 21/57

* cited by examiner

*Primary Examiner* — Sisley N Kim
(74) *Attorney, Agent, or Firm* — King Intellectual Asset Management (57) ABSTRACT

The disclosure provides a method for securing, by a hypervisor of a host, a first persistent volume used to maintain data for one or more first containers on the host. The method generally includes receiving a request to retain the first persistent volume when the one or more first containers are removed from the host, receiving a first container image associated with one of the one or more first containers, generating a first key for reserving the first persistent volume, the key based, at least in part, on the first container image, and reserving the first persistent volume for exclusive access by the hypervisor using the first key.

20 Claims, 4 Drawing Sheets

HYPERVISOR ASSISTED SECURITY OF DANGLING VOLUMES FOR CONTAINERS

RELATED APPLICATION

Benefit is claimed under 35 U.S.C. 119(a)-(d) to Foreign Application Serial No. 202141058903 filed in India entitled "HYPERVISOR ASSISTED SECURITY OF DANGLING VOLUMES FOR CONTAINERS", on Dec. 17, 2021, by VMware, Inc., which is herein incorporated in its entirety by reference for all purposes.

BACKGROUND

Virtualization is a process whereby software is used to create an abstraction layer over computer hardware that allows the hardware elements of a single computer to be divided into multiple virtual computers. The software used is called a hypervisor—a small layer that enables multiple operating systems (OSs) to run alongside each other, sharing the same physical computing resources. When a hypervisor is used on a physical server (also known as a bare metal server or a host) in a data center, the hypervisor allows the physical computer to separate its OS and applications from its hardware thereby enabling the creation and management of virtual machines (VMs). The result is that each VM contains a guest OS, a virtual copy of the hardware that the OS requires to run, and an application and its associated libraries and dependencies. Other types of virtual computing instances (VCIs) may also be used similarly as VMs.

While virtualization enables running multiple OSs on the hardware of a single physical server, containerization, on the other hand, enables deploying multiple applications using the same OS on a single VM or server. In particular, containerization is the packaging of software code with just the OS libraries and dependencies required to run the code to create a single lightweight executable, referred to as a container, which runs consistently on any infrastructure. Containers simplify delivery of distributed applications, and have become increasingly popular as organizations shift to cloud-native development and hybrid multi-cloud environments.

Docker is an example open source containerization platform which enables developers to package applications into containers. Developers may create containers without Docker, as well, or use other containerization platforms. Docker is essentially a toolkit that enables developers to build, deploy, run, update, and stop containers using simple commands and automation through application programming interfaces (APIs).

Docker containers are live, running instances of Docker images. Docker images contain executable application source code, as well as all the tools, libraries, and dependencies that the application source code needs to run as a container. Docker images are stored as series of read-only layers. When a container is started, Docker takes the read-only image and adds a read-write layer on top of the read-only layer. If the running container modifies an existing file, the file is copied out of the underlying read-only layer and into the top-most read-write layer where the changes are applied. The version in the read-write layer hides the underlying file, but does not destroy it. When a Docker container is deleted, relaunching the Docker image will start a fresh container without any of the changes made in the previously running container; thus, any previous changes are lost.

In order to preserve data generated by the running container, and also to share data between containers, container volumes are created and kept in storage attached to a host where the container is running. The container volume has a lifecycle that is longer than the lifecycle of the container, thereby allowing the volume to persist until the volume is no longer needed. The purpose of a container volume is to exist independent from its container; therefore, when the container is removed, the container volume is not automatically removed. When a container volume exists and is no longer connected to any containers, the container volume may be referred to as a dangling volume.

Dangling volumes may be vulnerable to attack by a malicious actor. In particular, a sequence of phases may be required for an attacker to successfully infiltrate data from a data center, or the data center itself. An attacker may exploit an identified vulnerability to carry out their attack. For example, where the attacker has gained access to one or more hosts in a data center, the attacker may look for dangling volumes situated on the one or more hosts and examine sensitive information maintained in these dangling volumes. Examples of such information may include database passwords, database usernames, privileged data, etc. The attacker may use such information to further attack the data center infrastructure and/or one or more running applications therein.

Docker provides commands to remove dangling volumes for purposes of clearing up space on a physical disk where the volume is maintained. Such commands are designed to require user interaction before execution. Thus, between when a container is deleted and when a dangling volume associated with the container is deleted, the dandling volume may be susceptible to attack.

Accordingly, there is a need in the art for techniques to protect dangling volumes to reduce the vulnerability of sensitive information maintained by dangling volumes to outside attack.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides techniques for the protection of persistent data, and more specifically, the protection of data maintained in persistent volumes associated with one or more containers.

In certain aspects, persistent reservation (PR) commands are used to control access to data maintained by a dangling volume, and more specifically, block access for unauthorized users to the data maintained by the dangling volume until the dangling volume is deleted (e.g., via user interaction) or migrated to an authorized owner of the persistent volume. An authorized owner of the persistent volume may be a container associated with the data preserved by the volume. PR commands used to control access to the dangling volumes may include PR commands specified by the small computer system interface (SCSI) standards (e.g., an SCSI-3 PR).

According to certain aspects described herein, a hypervisor of the host may set a reservation on a dangling volume to prevent others (e.g., other components of the host, outside attackers, etc.) from accessing or making changes to information maintained by the dangling volume. The reservation may be similar to a file-locking concept, in that only the components which are given access are able to access the dangling volume and access attempts by other components are denied. The reservation may be made using a PR key generated at the hypervisor. When the dangling volume is to be deleted or migrated to an authorized owner, the hypervisor may perform a release on the previously reserved volume (e.g., using the PR key) and further delete or grant the authorized owner access to the volume.

Generating PR keys and performing reservations at the hypervisor may improve the security of data maintained by the dangling volume. For example, by generating the PR key within the hypervisor context, others may not be aware a PR key has been generated, nor have access to the PR key. Without access to the PR key, the reservation on the persistent volume may not be released. Only the hypervisor may have access to the PR key to release the reservation; thus, the integrity of the data maintained within the persistent volume may be better protected.

Figure 1:
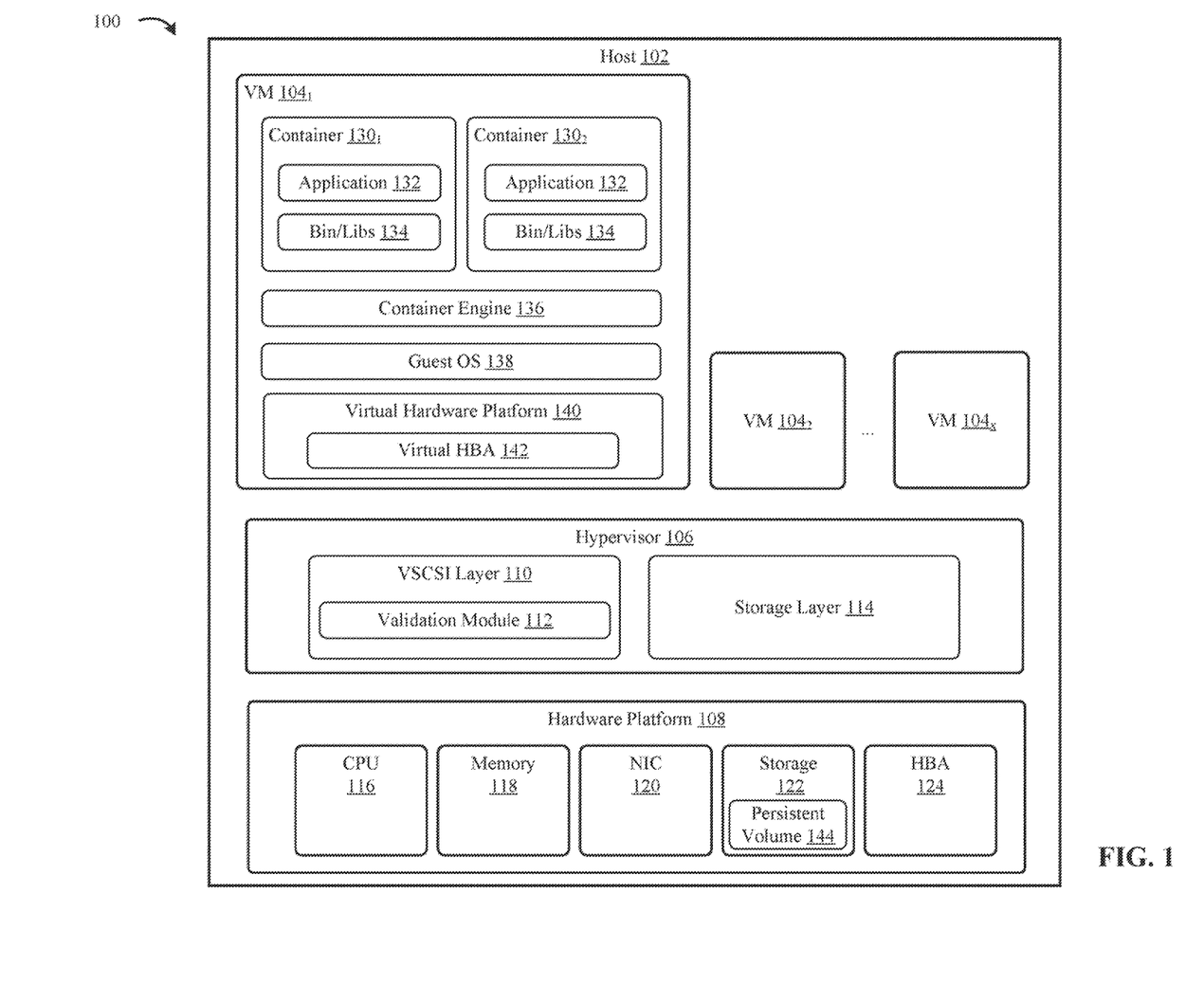
FIG. 1 depicts a computing system in which embodiments described herein may be implemented.

FIG. 1 is a block diagram that illustrates a computing system 100 in which embodiments described herein may be implemented. Computing system 100 includes one or more hosts 102 configured to provide a virtualization layer, also referred to as a hypervisor 106, that abstracts processor, memory, storage, and networking resources of hardware platform 108 into multiple VMs $104_1$ to $104_N$ (collectively referred to as VMs 104 and individually referred to as VM 104) that run concurrently on the same host 102. Hypervisor 106 may run on top of an OS in host 102. In some embodiments, hypervisor 106 can be installed as system level software directly on hardware platform 108 of host 102 (often referred to as "bare metal" installation) and be conceptually interposed between the physical hardware and the guest OSs executing in VMs 104. In some implementations, hypervisor 106 may comprise system level software as well as a "Domain 0" or "Root Partition" VM, which is a privileged machine that has access to the physical hardware resources of host 102. In this implementation, one or more of a virtual switch, virtual tunnel endpoint (VTEP), etc., along with hardware drivers, may reside in the privileged VM. One example of hypervisor 106 that may be used is a VMware ESXi™ hypervisor provided as part of the VMware vSphere® solution made commercially available from VMware, Inc. of Palo Alto, California.

Each VM 104 implements a virtual hardware platform 140 that supports the installation of a guest OS 138 which is capable of executing one or more applications. Guest OS 138 may be a standard, commodity operating system. Examples of a guest OS include Microsoft Windows, Linux, and the like. In some examples, guest OS 138 includes a native file system layer, for example, either a New Technology File System (NTFS) or an ext3 type file system layer. This file system layer interfaces with virtual hardware platform 140 to access, from the perspective of guest OS 138, a data storage host bus adapter (HBA), which in reality, is virtual HBA 142 implemented by virtual hardware platform 140 that provides the appearance of disk storage support to enable execution of guest OS 138 transparent to the virtualization of the system hardware. In certain embodiments, a virtual disk exposes the same abstraction as a real (physical) disk, that is, a linear list of sectors; however, a virtual machine monitor (VMM) may choose to implement virtual disks as regular files on host 102. Although, from the perspective of guest OS 138, file system calls initiated by the guest OS 138 to implement file system-related data transfer and control operations appear to be routed to virtual disks for final execution, in reality, such calls are processed and passed through virtual HBA 142 to hypervisor 106. In particular, the data transfer and control operations may be passed through various layers of hypervisor 106 to true hardware HBAs 124 or network interface cards (NICs) 120 that connect to storage 122 as described in more detail below.

In certain embodiments, one layer of hypervisor 106 is a virtual SCSI (VSCSI) layer 110 that, for example, receives commands from virtual HBA 142, in the form of SCSI command blocks. VSCSI layer 110 then converts the SCSI command blocks into file system operations that are understood by storage layer 114. In certain embodiments, VSCSI layer 110 includes a validation module 112. As described in more detail below, validation module 112 is configured to verify the identity of a container 130 requesting access to a persistent volume 144 reserved by hypervisor 106 to prevent unauthorized parties access to persistent volume 144.

Storage layer 114 is configured to manage storage space for VMs 104. In one embodiment, storage layer 114 may include numerous logical layers, such as an input/output (I/O) virtualization layer, a file system driver, and a disk access layer. In some embodiments, the I/O virtualization layer receives a data transfer and control operation (in the form of commands, for example, intended for a virtual disk) from VSCSI layer 110, and converts the operations into file system operations that are understood by a virtual machine file system (VMFS) driver in order to access a file stored in underlying storage under the management of the VMFS driver. The I/O virtualization layer then issues these file system operations to the VMFS driver. The VMFS driver, in general, manages creation, use, and deletion of files (e.g., such as .vmdk files representing virtual disks) stored on physical locations of, or in logical volumes or Logical Unit Numbers (LUNs) exposed by, storage 122 The VMFS driver converts the file system operations received from the I/O virtualization layer to raw SCSI operations, which are issued to a data access layer that applies command queuing and scheduling policies to the raw SCSI operations and ultimately sends the raw SCSI operations to components of physical hardware platform 108.

In certain embodiments, each VM 104 includes a container engine 136 installed therein and running as a guest application under control of guest OS 138. Container engine 136 is a process that enables the deployment and management of virtual instances (referred to interchangeably herein as "containers") by providing a layer of OS-level virtualization on guest OS 138 within VM 104. Containers $130_1$ to $130_y$ (collectively referred to as containers 130 and individually referred to as container 130) are software instances that enable virtualization at the OS level. That is, with containerization, the kernel of an OS that manages host 102 is configured to provide multiple isolated user space instances, referred to as containers. Containers 130 appear as unique servers from the standpoint of an end user that communicates with each of containers 130. However, from the standpoint of the OS that manages host 102 on which the containers execute, the containers are user processes that are scheduled and dispatched by the OS. Examples of a container engine 136 include the open-source Docker platform made available by Mirantis, Inc. which previously acquired Docker, Inc.

Containers 130 encapsulate an application, such as application 132 as a single executable package of software that bundles application code together with all of the related configuration files, libraries, and dependencies required for it to run. Application 132 may be any software program, such as a word processing program. Bins/libraries 134 and other runtime components are developed or executed separately for each container 130.

Hardware platform 108 of each host 102 includes components of a computing device such as one or more processors (central processing units (CPUs)) 116, memory 118, a network interface card including one or more network adapters, also referred to as NICs 120, storage 122, HBA 124, and other I/O devices such as, for example, a mouse and keyboard (not shown). CPU 116 is configured to execute instructions, for example, executable instructions that perform one or more operations described herein and that may be stored in memory 118 and in storage 122.

Memory 118 is hardware allowing information, such as executable instructions, configurations, and other data, to be stored and retrieved. Memory 118 is where programs and data are kept when CPU 116 is actively using them. Memory 118 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

NIC 120 enables host 102 to communicate with other devices via a communication medium. HBA 124 couples host 102 to one or more external storages (not shown), such as a storage area network (SAN). Other external storages that may be used include network-attached storage (NAS) and other network data storage systems, which may be accessible via NIC 120.

Storage 122 represents persistent storage devices (e.g., one or more hard disks, flash memory modules, solid state drives (SSDs), and/or optical disks). Although the example embodiment shown in FIG. 1 illustrates storage 122 as local storage in hardware platform 108, in some other embodiments, storage 122 is storage directly coupled to host 102. In some other embodiments, storage 122 is a virtual storage area network (VSAN) that aggregates local or direct-attached capacity devices of a host cluster, including host 102, and creates a single storage pool shared across all hosts in the cluster.

In certain embodiments, storage 122 includes persistent volume 144. Persistent volume 144 is storage for one or more containers 130 that has been manually provisioned, e.g., by an administrator, or dynamically or automatically provisioned. In certain embodiments, persistent volume may represent a physical disk or file system local to host 102.

In certain embodiments, persistent volume 144 is a volume plugin that has a lifecycle independent of any individual container 130 that uses persistent volume 144. Accordingly, when all containers 130 associated with a persistent volume 144 are removed from host 102 (e.g., all containers 130 are no longer running), persistent volume 144 may still exist. Thus, persistent volume 144 may be referred to as a dangling volume indicating that persistent volume 144 is not related to any running container 130.

In some cases, persistent volume 144 may become a dangling volume when a last running container 130 associated with persistent volume 144 is killed (e.g., terminated), for example, by an administrator of container 130 (which may be considered as a "graceful shutdown" of container 130). In such a case, persistent volume 144 may no longer be needed; thus, the administrator may also remove persistent volume 144 associated with container 130. For the period of time between when container 130 is killed and persistent volume 144 is removed, data maintained for container 130 in persistent volume 144 may be vulnerable to attack. In particular, an attacker who has gained unauthorized access to a VM 104 in the user space of host 102 may subsequently access sensitive data maintained by persistent volume 144.

In some other cases, persistent volume 144 may become a dangling volume when a last running container 130 associated with persistent volume 144 crashes. In such a case, persistent volume 144 associated with container 130 which has crashed may be retained for use by a new container 130 when it is spawned from a container image associated with container 130 which previously crashed (e.g., container 130 is a live, running instance of a container image). When a new container 130 is spawned by an administrator, container 130 may reclaim ownership of persistent volume 140 (e.g., the dangling volume). However, for the period of time between when container 130 crashes and a new container 130 is spawned for reclamation of persistent volume 144, data maintained for container 130 in persistent volume 144 may be vulnerable to attack.

Accordingly, aspects of the present disclosure introduce techniques for protecting the integrity of information maintained by dangling volumes. In certain aspects, persistent reserve commands (e.g., SCSI-3 PR commands) are used by hypervisor 106 to control access to information maintained by a dangling volume, and more specifically, block access to information maintained by the dangling volume until the dangling volume is either deleted (e.g., via administrator interaction) or migrated to a new container that is associated with data preserved by the volume, when the new container is created.

Figure 2:
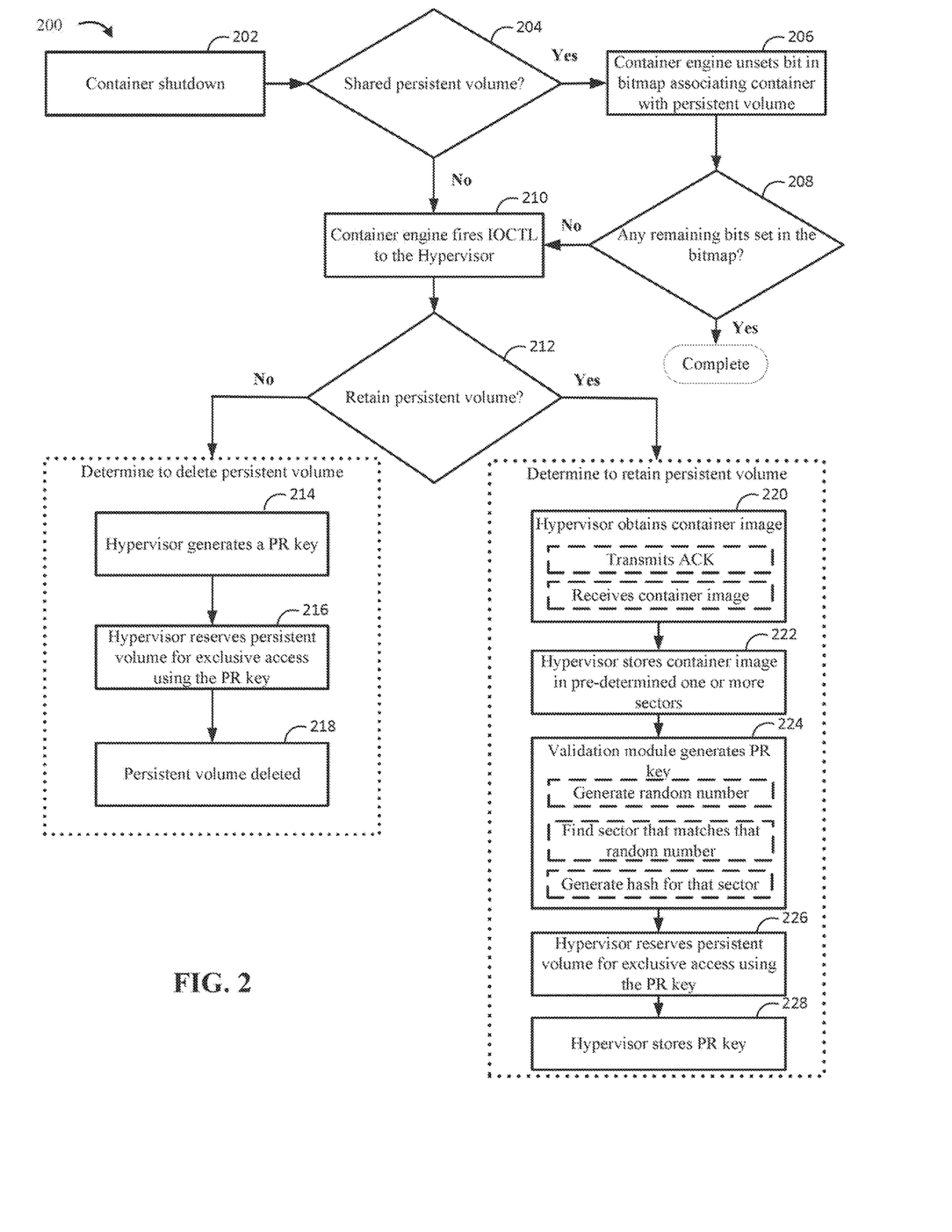
FIG. 2 is an example workflow for using persistent reservation mechanisms to protect data maintained by dangling volumes in the computing system of FIG. 1, according to an example embodiment of the present application.

FIG. 2 is an example workflow 200 for using persistent reservation mechanisms to protect data maintained by dangling volumes in the computing system 100 of FIG. 1, according to an example embodiment of the present application. Workflow 200 may be used to identify whether a persistent volume 144 (e.g., when not associated with any running container 130) is to be deleted or retained, and to perform a reservation on the persistent volume 144 prior to deletion or storage of the persistent volume 144 for future use by a new container 130. Reservation of persistent volume 144 may improve security of data maintained by persistent volume 144 by restricting access to such data maintained by persistent volume 144. As described in more detail below, hypervisor 106 may use an SCSI-3 PR command to reserve persistent volume 144 for exclusive access thereby granting access to the data by only hypervisor 106. Workflow 200 of FIG. 2 may be performed, for example, by container engine 136 and hypervisor 106, for example, through VSCSI layer 110 and validation module 112, illustrated in FIG. 1.

Workflow 200 begins, at operation 202, by a container 130 being shut down. In other words, workflow 200 may begin when a container 130 is no longer running on host 102. As mentioned, in some cases, the shutdown may occur due to administrator interaction, while in some other cases, the shutdown may occur due to container 130 crashing.

For purposes of this illustration, it may be assumed that prior to the shutdown of container 130, persistent volume 144 was provisioned for storage for, at least, container 130. Persistent volume 144 may be a non-shared persistent volume meaning container 130 is granted exclusive usage of persistent volume 144 for storage. Persistent volume 144 may be a shared persistent volume meaning container 130, as well as one or more other containers on host 102, use persistent volume 144 for storage. Where persistent volume 144 is non-shared, persistent volume 144 becomes a dangling volume when container 130 is no longer running on host 102. However, where persistent volume 144 is shared, other containers may still be using persistent volume 144 when container 130 is no longer running on host 102; thus, persistent volume 144 may not be considered a dangling volume after container 130 is shutdown. Where persistent volume 144 is shared, persistent volume 144 may be considered a dangling volume when all containers 130 sharing the persistent volume 144 are shutdown.

In cases where persistent volume 144 is shared between two or more containers 130, persistent volume 144 may include a mechanism to identify which containers 130 and/or how many containers 130 share persistent volume 144. In some embodiments, a bitmap is used to identify which containers 130 share persistent volume 144, wherein each bit of the bitmap identifies a specific container 130 which shares persistent volume 144. In some embodiments, a bitmap is used to identify a number of containers 130 which share persistent volume 144, wherein each bit of the bitmap corresponds to one container 130. The bitmap may be stored in persistent volume 144, or any other feasible location, on or attached to host 102, where it may be accessed by container engine 136.

At operation 204, container engine 136 determines whether persistent volume 144 associated with container 130 is shared. Where container engine 136 determines persistent volume 144 is shared, at operation 206, container engine 136 unsets a bit in a bitmap associating container 130 with persistent volume 144. In some cases, the unset bit is a bit specific to container 130. In some other cases, the unset bit is any bit of a plurality of bits indicating the number of containers 130 using persistent volume 144.

At operation 208, container engine 136 checks the bitmap to determine whether any remaining bits are set in the bitmap. Remaining bits may be set in the bitmap where one or more other containers 130 are still running on host 102 and accessing persistent volume 144. Where one or more bits remain in the bitmap, no further action may be needed to protect persistent volume 144, as persistent volume 144 is not considered a dangling volume at this point. Accordingly, workflow 200 may be complete.

Alternatively, where the bit unset by container engine 136, for example, at operation 206, is the last bit in the bitmap maintained for persistent volume 144, persistent volume 144 may be a dangling volume. Thus, to protect data maintained by persistent volume 144 for container 130, reservation of the data is triggered by container engine 136, at operation 210, firing a system call, or input/output control (IOCTL), to persistent volume 144. In particular, the IOCTL fired by container engine 136 to persistent volume 144 may be for hypervisor-specific operations; thus, hypervisor 106, through VSCSI layer 110, handles the IOCTL.

In certain embodiments, the IOCTL includes a request code number, wherein the effect of the IOCTL depends on that request code number. The request code number may be specific to persistent volume 144 and thereby trigger hypervisor 106 to determine whether persistent volume 144 is to be retained for later use by another container 130. In certain embodiments, the IOCTL includes a request code number which triggers hypervisor 106 to check a (e.g., Boolean) value also transmitted with the request code number. The value transmitted by container engine 136 may aid container engine 136 in determining whether to delete or retain persistent volume 144, at operation 212. For example, in some cases, a Boolean value of "false" indicates to hypervisor 106 that persistent volume 144 is to be deleted, while a Boolean value of "true" indicates to hypervisor 106 that persistent volume 144 is to be retained.

Where, at operation 212, hypervisor 106 determines to delete persistent volume 144, at operation 214, hypervisor 106 obtains a PR key for reservation of persistent volume 144. As mentioned previously, for the period of time between when container 130 is killed and persistent volume 144 is deleted, data maintained for container 130 in persistent volume 144 may be vulnerable to attack. Thus, the PR key generated by hypervisor 106 at operation 214 may be used to perform a reservation on persistent volume 144 to protect the data maintained by persistent volume 144 prior to deletion of the volume. In certain embodiments, the PR key obtained by hypervisor 106, at operation 214, is a pre-determined PR key specific to persistent volume 144. In certain embodiments, the PR key is obtained by hypervisor 106 by hypervisor 106 generating a random number and using the random number as the PR key or deriving a PR key from the generated random number.

At operation 216, hypervisor 106 reserves persistent volume 144 for exclusive access using the PR key. At operation 218, persistent volume 144 is deleted. In certain embodiments, the deletion of persistent volume 144 is immediately after persistent volume 144 is reserved for exclusive access. In certain other embodiments, the deletion of persistent volume 144 occurs a period of time after persistent volume 144 is reserved for exclusive access. However, regardless of whether persistent volume 144 is deleted immediately after or a period of time after persistent volume 144 is reserved, persistent volume 144 may be protected from outside attackers during this time period prior to when persistent volume 144 is deleted.

Referring back to operation 212, when hypervisor 106 receives an IOTCL from container engine 136 and determines persistent volume 144 is to be retained (in certain embodiments, based on a Boolean value being "true"), at operation 220, hypervisor 106 obtains a container image (e.g., a base container image, not including the running image, which, in certain aspects, is loaded in memory 118) of container 130 from container engine 136. In certain aspects, the container image of container 130 is retrieved from memory or storage of virtual hardware platform 140, backed by memory 118 or storage 122. In certain embodiments, the container image of container 130 is transmitted concurrently with the IOCTL from container engine 136. In certain embodiments, the IOCTL triggers hypervisor 106 to acknowledge receipt of the IOCTL before the container image is transmitted to hypervisor 106 by container engine 136. In such embodiments, hypervisor 106 may transmit an acknowledgement (ACK) response to container engine 136 requesting the container image of container 130. In response, container engine 136 transmits the container image associated with container 130 which is received by hypervisor 106.

At operation 222, hypervisor 106 stores the received container image in one or more (e.g., pre-determined) sectors of persistent volume 144. The number of sectors in persistent volume 144 used to store the container image may be dependent on the size of the container image. As an illustrative example, in some cases, the container image may be 16 KB and stored in 16 sectors (e.g., sectors previously reserved for storing this container image). As will be described in more detail with respect to FIG. 3, storing the container image at persistent volume 144 may, at a later time, be used by hypervisor 106 in validating a container 130 attempting to request access to persistent volume 144. In particular, the container image stored in persistent volume 144 may be used as a tool to validate the identify of a container 130, and more specifically, ensure a container 130 attempting to gain access to persistent volume 144 is an owner of data maintained by persistent volume 144 by comparing the container image stored in persistent volume 144 with a container image of the requesting container 130.

At operation 224, validation module 112 of VSCSI layer 110 generates a PR key for exclusive reservation of persistent volume 144. The PR key generated by validation module 112 at operation 224 may be used to perform a reservation on persistent volume 144 to protect the data maintained by persistent volume 144 while persistent volume 144 is not associated with any running container 130.

In certain embodiments, the PR key is generated by validation module 112 taking a hash of the entire container image. Validation module 112 may use, for example, a cryptographic hashing algorithm such as the SHA-1 algorithm to generate the hash for the entire container image. In some cases, the PR key is the calculated hash, while in some other cases the calculated hash is used to derive the PR key.

In certain other embodiments, the PR key is generated by validation module 112 generating a random number, wherein the random number is an integer between, and including, 1 and a max number of sectors where the container image was stored (e.g., using the previous example, validation module 112 generates a random number, x, where 1≤x≤16). The random number may indicate to validation module 112 what sector containing the container image is used to generate a hash. In particular, validation module may use the random number to locate a corresponding sector of the container image, read the portion of the container image stored in that sector, and calculate a hash for that portion of the container image. In some cases, the PR key is the calculated hash, while in some other cases the calculated hash is used to derive the PR key. In such embodiments, I/O costs as well as compute power may be saved by having to only read and produce a hash for one sector of the container image, as opposed to all sectors used to store the container image.

At operation 226, hypervisor 106 reserves persistent volume 144 for exclusive access using the PR key. At operation 228, hypervisor 106 stores the PR key. In certain embodiments, the PR key is stored in a block contiguous to persistent volume 144. By storing the PR key together with persistent volume 144, Boolean logic may not be needed to locate a PR key for a reserved persistent volume 144.

Reserving persistent volume 144 for exclusive access by hypervisor 106 blocks others (e.g., other components of computing system 100, outside attackers, etc.) from accessing the data maintained by persistent volume 144, thereby improving the security of data maintained by persistent volume 144. Further, because the PR key is generated within the hypervisor context, others may not be aware a PR key has been generated, nor have access to the PR key. Without access to the PR key, the reservation on persistent volume 144 is not released. Only hypervisor 106 has access to the PR key to release the reservation; thus, even further improving security of the data maintained within persistent volume 144.

In certain embodiments where a container 130 has crashed and its associated persistent volume has been reserved and stored according to the operations of workflow 200 presented in FIG. 2, when a new container 130 is spawned using a container image from the previously crashed container 130, the new container 130 may be configured to reclaim the persistent volume 144 previously reserved and stored. However, to gain access to persistent volume 144, the new container 130 first proves to hypervisor 106 that container 130 is the authorized owner of persistent volume 144. Validation of container 130 as the authorized owner of the previously reserved persistent volume 144 is described with respect to FIG. 3.

Figure 3:
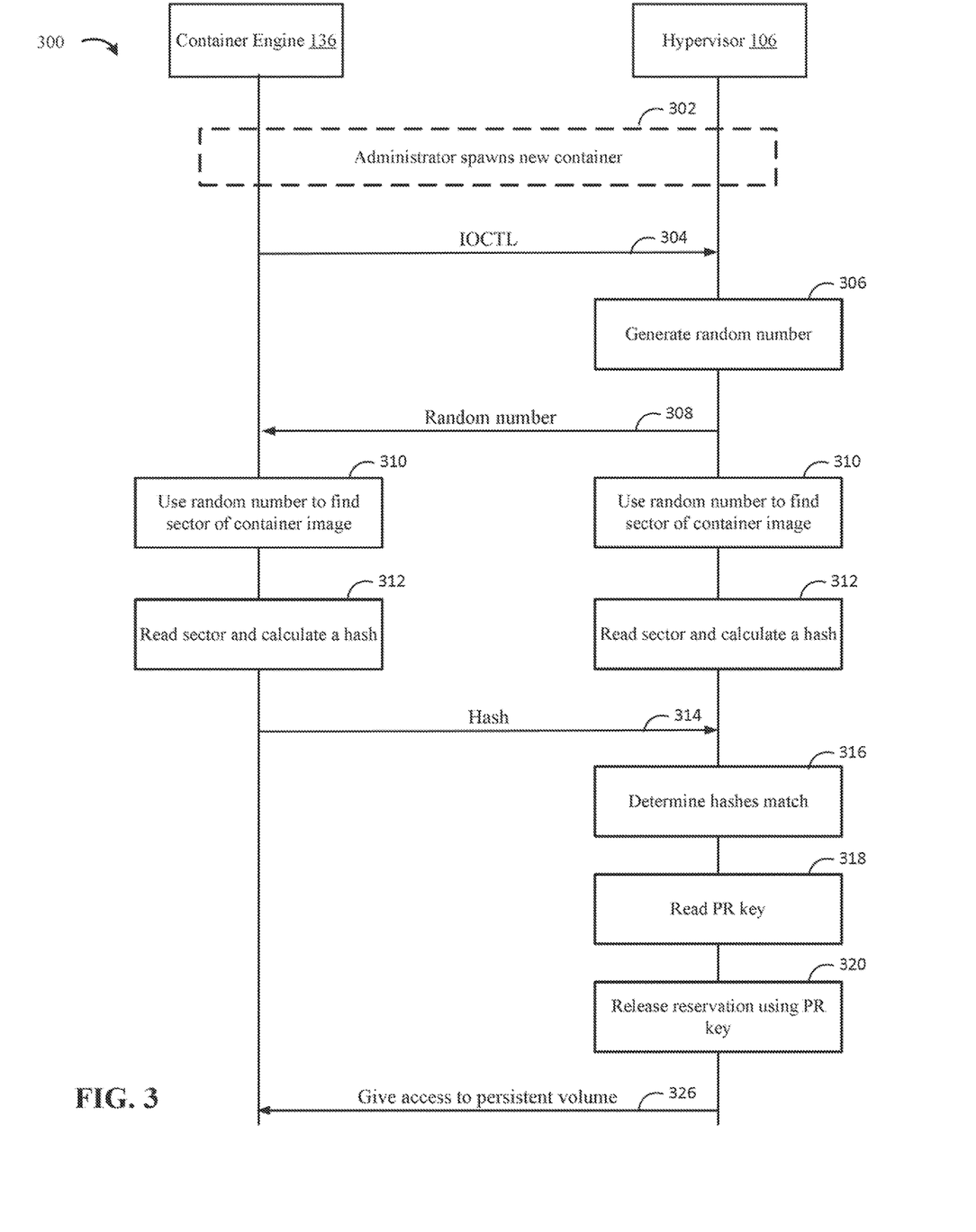
FIG. 3 is a call flow diagram illustrating example operations for container validation, according to an example embodiment of the present disclosure.

In particular, FIG. 3 is a call flow diagram 300 illustrating example operations for container validation, according to an example embodiment of the present disclosure. As shown, the operations illustrated in FIG. 3 may be performed by container engine 136 and hypervisor 106, including VSCSI layer 110 and validation module 112, to determine whether a container 130 requesting a previously reserved persistent volume 144 (e.g., via operations presented in FIG. 2) is an authorized owner of persistent volume 144. Where it is determined that the container 130 is the authorized owner, hypervisor 106 performs a release on the previously reserved persistent volume 144 and further grants the authorized container 130 access to persistent volume 144.

Call flow diagram 300 begins at operation 302 by an administrator spawning a new container 130. The new container 130 is a live, running instance of a container image for which a previously crashed container 130 was created from. To allow container 130 to reclaim a persistent volume 144 storing data associated with container 130, container engine 136, at operation 304, fires an IOCTL to persistent volume 144 which is handled by hypervisor 106 through, for example, VSCSI layer 110.

In certain embodiments, the IOCTL includes a request code number that is specific to persistent volume 144 and thereby indicates to hypervisor 106 that container 130 is requesting access to persistent volume 144. Further, the IOCTL may trigger hypervisor 106, and more specifically validation module 112 of hypervisor 106, to generate a random number at operation 306. The random number is generated and passed to container engine 136 at operation 308. The random number generated may be an integer between, and including, one and a maximum number of sectors where a container image associated with persistent volume 144 has been stored. For example, the random number generated by validation module 112 may be a random number x, where 1≤x≤maximum number of sectors used to store a container image at persistent volume 144 at operation 222 in FIG. 2.

At operation 310, container engine 136 uses the generated random number to locate a corresponding sector where its container image is stored (e.g., in certain aspects, loaded in memory 118), reads the portion of the container image stored in that sector, and calculates a hash for that portion of the container image. Similarly, at operation 310, validation module 112 uses the generated random number to locate a corresponding sector of the container image stored in persistent volume 144, read the portion of the container image stored in that sector, and, at operation 312, calculate a hash for that portion of the container image.

As an illustrative example, the random number generated by validation module 112 may be 5 where a total number of sectors used to store a container image at persistent volume 144 is 10, and more specifically, in sectors 11-20. Accordingly, validation module 112 uses the random number generated to locate a fifth sector containing the container image. In this case, validation module 112 locates sector 15, reads the container image stored in sector 15, and calculates a hash for that portion of the container image stored in sector 15. Similarly, a container image stored by container engine 136 may be stored in, for example, sectors 55-64. Container engine 136 uses the random number generated by validation module 112 to locate a fifth sector among sectors 55-64. In this case, container engine 136 locates sector 59, reads the container image stored in sector 59, and calculates a hash for that portion of the container image stored in sector 59. At operation 316, container engine 136 transmits its calculated hash to hypervisor 106.

While FIG. 3 illustrates operations 310 and 312 for each of container engine 136 and hypervisor 106 happening simultaneously, in certain embodiments, operations 310 and 312 performed at each of container engine 136 and hypervisor 106 may not occur at the same time. Further, while FIG. 3 illustrates hypervisor 106 performing operations 310 and 312 after transmitting the random number to container engine 136 at operation 308 and before receiving the hash at operation 314, in certain embodiments, hypervisor 106 may perform operations 310 and/or 312 prior to transmitting the random number to container engine 136 or after receiving the hash from container engine 136 at operation 314.

At operation 316, hypervisor 106 compares its calculated hash to the hash received from container engine 136. If container 130 is the authorized owner of persistent volume 144, then the hash calculated by container engine 136 is expected to match the hash calculated by hypervisor 106, as both container 130 and hypervisor 106 should have the same container image. On the other hand, where an outside attacker or an imposter of container 130 is attempting to access persistent volume 144, a hash calculated by the outside attacker or imposter of container 130 may not match the hash calculated by hypervisor 106. In this case, hypervisor 106 determines the hashes are not a match and does not proceed to grant the outside attacker or imposter access to persistent volume 144.

For purposes of this illustration, it may be assumed that container 130 is the authorized owner of persistent volume 144. Thus, at operation 316, hypervisor 106 determines the hash received from container engine 136 matches the hash calculated by hypervisor 106 thereby indicating that the container images match and container 130 (e.g., spawned from this container image) is the authorized owner of persistent volume 144.

Accordingly, at operation 316, hypervisor 106 reads the PR key stored for persistent volume 144 (e.g., the PR key stored at operation 228 illustrated in FIG. 2). At operation 318, hypervisor 106 may use the PR key to release the reservation on persistent volume 144. Releasing the reservation allows container 130 to access persistent volume 144. At operation 320, hypervisor 106 grants container 130 access to persistent volume 144. Hypervisor 106 relays this access to container 130 through container engine 136. Container 130 may subsequently use persistent volume 144 to persist its data.

Figure 4:
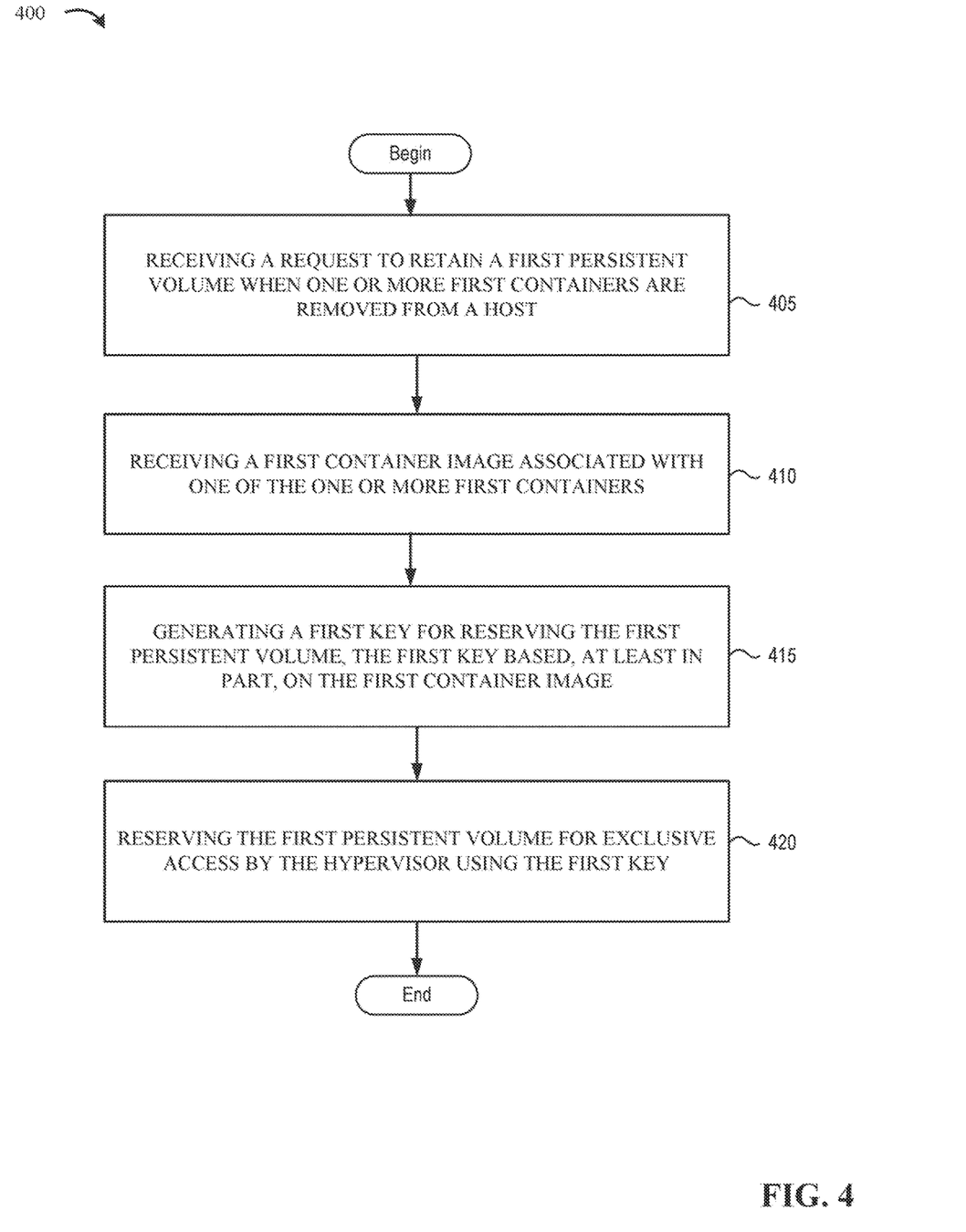
FIG. 4 is a flow diagram illustrating example operations for securing a persistent volume used to maintain data for one or more containers on a host, according to an example embodiment of the present disclosure.

FIG. 4 is a flowchart illustrating a method (or process) 400 for securing a first persistent volume used to maintain data for one or more containers on a host, according to an example embodiment of the present application. In certain embodiments, process 400 may be performed by hypervisor 106 on host 102 as shown in FIG. 1.

Process 400 begins, at block 405, by hypervisor 106 receiving a request to retain a first persistent volume when one or more first containers are removed from a host. The first persistent volume may be used to maintain data for the one or more first containers on the host.

In certain embodiments, the first persistent volume is used to maintain data for two or more first containers on the host, a bitmap is maintained in the first persistent volume, wherein each bit in the bitmap corresponds to each of the two or more first containers. Further, the request to retain the first persistent volume may be received when all bits in the bitmap have been unset, wherein a bit in the bitmap may be unset when a container corresponding to the bit is removed from the host.

At block 410, hypervisor 106 receives a first container image associated with one of the one or more first containers.

At block 415, hypervisor 106 generates a first key for reserving the first persistent volume, the first key based, at least in part, on the first container image.

At block 420, hypervisor 106 reserves the first persistent volume for exclusive access by hypervisor 106 using the first key.

In certain embodiments, process 400 further includes hypervisor 106 receiving a request, from a container, for access to the first persistent volume, calculating a first hash using at least the first container image, receiving a second hash from the container, wherein the second hash is based, at least in part, on a second container image associated with the container, verifying the first hash matches the second hash, releasing the reservation on the first persistent volume using the first key, and granting the container access to the first persistent volume.

In certain embodiments, process 400 further includes hypervisor 106 generating a random number and transmitting the random number to the container, wherein the second hash received from the container is based, at least in part, on a sector of the container image corresponding to the random number. In certain embodiments, calculating the first has using at least the first container image includes locating a second sector where the first container image is stored, wherein the second sector corresponds to the random number, reading the second sector, and calculating the first hash based, at least in part, on the second sector.

In certain embodiments, process 400 further includes hypervisor 106 receiving a request to delete a second persistent volume, used to maintain data for one or more second containers on the host, when the one or more second containers are removed from the host, receiving a second container image associated with one of the one or more second hosts, generating a second key for reserving the second persistent volume, the key based, at least in part, on the second container image associated with one of the one or more second hosts, reserving the second persistent volume for exclusive access by the hypervisor using the second key, and deleting the second persistent volume.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method comprising:
    receiving a request to retain a first persistent volume used to maintain data for one or more first containers on a host, when the one or more first containers are removed from the host;
    receiving a first container image associated with one of the one or more first containers;
    generating a first key for reserving the first persistent volume, the first key based, at least in part, on the first container image; and
    reserving the first persistent volume for exclusive access by the hypervisor using the first key;

receiving a request, from a container, for access to the first persistent volume;
calculating a first hash using at least the first container image;
receiving a second hash from the container, wherein the second hash is based, at least in part, on a second container image associated with the container;
verifying the first hash matches the second hash;
releasing the reservation on the first persistent volume using the first key; and
granting the container access to the first persistent volume.

2. The method of claim 1, further comprising:
generating a random number; and
transmitting the random number to the container, wherein the second hash received from the container is based, at least in part, on a sector of the container image corresponding to the random number.

3. The method of claim 2, wherein calculating the first hash using at least the first container image comprises:
locating a second sector where the first container image is stored, wherein the second sector corresponds to the random number;
reading the second sector; and
calculating the first hash based, at least in part, on the second sector.

4. The method of claim 1, further comprising:
receiving a request to delete a second persistent volume, used to maintain data for one or more second containers on the host, when the one or more second containers are removed from the host;
receiving a second container image associated with one of the one or more second hosts;
generating a second key for reserving the second persistent volume, the key based, at least in part, on the second container image associated with one of the one or more second hosts;
reserving the second persistent volume for exclusive access by the hypervisor using the second key; and
deleting the second persistent volume.

5. The method of claim 1, wherein when the first persistent volume is used to maintain data for two or more first containers on the host, a bitmap is maintained in the first persistent volume, wherein each bit in the bitmap corresponds to each of the two or more first containers.

6. The method of claim 5, wherein the request to retain the first persistent volume is received when all bits in the bitmap have been unset, wherein a bit in the bitmap is unset when a container corresponding to the bit is removed from the host.

7. The method of claim 1, wherein:
the operations are performed by a hypervisor of the host; and
the operations secure the first persistent.

8. A system comprising:
one or more processors; and
at least one memory, the one or more processors and the at least one memory configured to:
receive a request to retain a first persistent volume used to maintain data for one or more first containers on a host, when the one or more first containers are removed from the host;
receive a first container image associated with one of the one or more first containers;
generate a first key for reserving the first persistent volume, the first key based, at least in part, on the first container image;
reserve the first persistent volume for exclusive access by a hypervisor of the host using the first key;
receive a request, from a container, for access to the first persistent volume;
calculate a first hash using at least the first container image;
receive a second hash from the container, wherein the second hash is based, at least in part, on a second container image associated with the container;
verify the first hash matches the second hash;
release the reservation on the first persistent volume using the first key; and
grant the container access to the first persistent volume.

9. The system of claim 8, wherein the one or more processors and the at least one memory are further configured to:
generate a random number; and
transmit the random number to the container, wherein the second hash received from the container is based, at least in part, on a sector of the container image corresponding to the random number.

10. The system of claim 9, wherein calculating the first hash using at least the first container image comprises:
locating a second sector where the first container image is stored, wherein the second sector corresponds to the random number;
reading the second sector; and
calculating the first hash based, at least in part, on the second sector.

11. The system of claim 8, wherein the one or more processors and the at least one memory are further configured to:
receive a request to delete a second persistent volume, used to maintain data for one or more second containers on the host, when the one or more second containers are removed from the host;
receive a second container image associated with one of the one or more second hosts;
generate a second key for reserving the second persistent volume, the key based, at least in part, on the second container image associated with one of the one or more second hosts;
reserve the second persistent volume for exclusive access by the hypervisor using the second key; and
delete the second persistent volume.

12. The system of claim 8, wherein when the first persistent volume is used to maintain data for two or more first containers on the host, a bitmap is maintained in the first persistent volume, wherein each bit in the bitmap corresponds to each of the two or more first containers.

13. The system of claim 12, wherein the request to retain the first persistent volume is received when all bits in the bitmap have been unset, wherein a bit in the bitmap is unset when a container corresponding to the bit is removed from the host.

14. A non-transitory computer-readable medium comprising instructions that, when executed by one or more processors of a computing system, cause the computing system to perform operations comprising:
receiving a request to retain a first persistent volume used to maintain data for one or more first containers on a host when the one or more first containers are removed from the host;
receiving a first container image associated with one of the one or more first containers;

generating a first key for reserving the first persistent volume, the first key based, at least in part, on the first container image;

reserving the first persistent volume for exclusive access by the hypervisor using the first key;

receiving a request, from a container, for access to the first persistent volume;

calculating a first hash using at least the first container image;

receiving a second hash from the container, wherein the second hash is based, at least in part, on a second container image associated with the container;

verifying the first hash matches the second hash;

releasing the reservation on the first persistent volume using the first key; and granting the container access to the first persistent volume.

15. The non-transitory computer-readable medium of claim 14, wherein the operations further comprise:

generating a random number; and transmitting the random number to the container, wherein the second hash received from the container is based, at least in part, on a sector of the container image corresponding to the random number.

16. The non-transitory computer-readable medium of claim 15, wherein calculating the first hash using at least the first container image comprises:

locating a second sector where the first container image is stored, wherein the second sector corresponds to the random number;

reading the second sector; and calculating the first hash based, at least in part, on the second sector.

17. The non-transitory computer-readable medium of claim 14, wherein the operations further comprise:

receiving a request to delete a second persistent volume, used to maintain data for one or more second containers on the host, when the one or more second containers are removed from the host;

receiving a second container image associated with one of the one or more second hosts;

generating a second key for reserving the second persistent volume, the key based, at least in part, on the second container image associated with one of the one or more second hosts;

reserving the second persistent volume for exclusive access by the hypervisor using the second key; and deleting the second persistent volume.

18. The non-transitory computer-readable medium of claim 14, wherein when the first persistent volume is used to maintain data for two or more first containers on the host, a bitmap is maintained in the first persistent volume, wherein each bit in the bitmap corresponds to each of the two or more first containers.

19. The non-transitory computer-readable medium of claim 18, wherein the request to retain the first persistent volume is received when all bits in the bitmap have been unset, wherein a bit in the bitmap is unset when a container corresponding to the bit is removed from the host.

20. The non-transitory computer readable medium of claim 14, wherein:

the operations are performed by a hypervisor on the first host; and the operations secure a first persistent volume used to maintain data for one or more first containers on the host.

* * * * *